(12) United States Patent
Gresset

(10) Patent No.: US 11,924,016 B2
(45) Date of Patent: Mar. 5, 2024

(54) METHOD AND DEVICE FOR MULTILEVEL POLAR-CODED MODULATION TRANSMITTING AND RECEIVING

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/764,345

(22) PCT Filed: Sep. 4, 2020

(86) PCT No.: PCT/JP2020/034383
§ 371 (c)(1),
(2) Date: Mar. 28, 2022

(87) PCT Pub. No.: WO2021/079643
PCT Pub. Date: Apr. 29, 2021

(65) Prior Publication Data
US 2022/0345351 A1 Oct. 27, 2022

(30) Foreign Application Priority Data
Oct. 22, 2019 (EP) .................... 19306369

(51) Int. Cl.
*H04L 27/34* (2006.01)
*H04L 1/00* (2006.01)
(52) U.S. Cl.
CPC ........ *H04L 27/3405* (2013.01); *H04L 1/0002* (2013.01); *H04L 1/0058* (2013.01)
(58) Field of Classification Search
CPC .. H04L 27/3405; H04L 1/0002; H04L 1/0058
See application file for complete search history.

(56) References Cited

U.S. PATENT DOCUMENTS

| 2015/0091742 A1 | 4/2015 | Ionita et al. |
| 2017/0126354 A1* | 5/2017 | Marsland ................ H04L 1/203 |

(Continued)

OTHER PUBLICATIONS

Chen et al., "Polar Coded Modulation with Optimal Constellation Labeling", Jul. 10, 2013, XP055686725, Retrieved from the Internet: URL:https://arxiv.org/pdf/1307.2799.pdf [retrieved on Apr. 17, 2020].

(Continued)

*Primary Examiner* — Freshteh N Aghdam
(74) *Attorney, Agent, or Firm* — BIRCH, STEWART, KOLASCH & BIRCH, LLP

(57) ABSTRACT

The present disclosure relates to a method (50) for transmitting a data stream from a transmitting device (30) to a receiving device (40), the data stream comprising m data sub-streams, said method (50) comprising: encoding (S51) the data sub-streams with respective polar codes, such as to produce m polar-encoded data sub-streams, modulating (S52) the m polar-encoded data sub-streams onto symbols of a multilevel modulation comprising m levels defining $2^m$ different symbols, such as to produce a symbol stream, transmitting (S53) the symbol stream to the receiving device (40), wherein the $2^m$ symbols of the multilevel modulation are distributed in the complex plane such that they are regularly spaced along the real axis and the complex axis by a spacing factor K, the predetermined labeling function Z being such that $\Phi(Z) < 1.7^m \times (0.0425 \times m - 0.06)$, expression in which:

$$\Phi(Z) = \sum_{i=1}^{m} \sum_{\{c_1,\ldots,c_m\}} \sum_{\{c'_1,\ldots,c'_m\}\setminus\{c_i,\ldots,c_m\}} e^{-\frac{4}{K^2}|Z(c_1,\ldots,c_m)-Z(c_1,\ldots,c_{i-1},c'_i,\ldots,c'_m)|^2}.$$

13 Claims, 7 Drawing Sheets

(56) References Cited

U.S. PATENT DOCUMENTS

2020/0321982 A1* 10/2020 Kamiya ............ H03M 13/6516
2022/0263694 A1*  8/2022 Iscan ..................... H04L 1/0058
2022/0393701 A1* 12/2022 Fujimori ............... H03M 13/13

OTHER PUBLICATIONS

International Search Report, issued in PCT/JP2020/034383, dated Jan. 12, 2021.
Written Opinion of the International Searching Authority, issued in PCT/JP2020/034383, dated Jan. 12, 2021.
Zhou et al., "Polar-Coded Modulation Based on the Amplitude Phase Shift Keying Constellations", China Communications, China Institute of Communications, Piscataway, NJ, USA, vol. 14, No. 9, Sep. 1, 2017, pp. 166-177.

* cited by examiner

METHOD AND DEVICE FOR MULTILEVEL POLAR-CODED MODULATION TRANSMITTING AND RECEIVING

TECHNICAL FIELD

This disclosure relates to digital telecommunication systems, and relates more specifically to a multilevel polar-coded modulation scheme.

BACKGROUND ART

Most modern telecommunication systems rely on the combination of quadrature amplitude modulation, QAM, modulations (or at least discrete constellations) and error correcting codes, leading to so-called coded modulations. Today, the most common architecture is called bit-interleaved coded modulation (BICM), which involves a bit interleaver between the output of the error correcting code and the input of the symbol modulator. During the quest for the best coded modulation scheme (from around 60 years ago), several other architectures were invented such as trellis-coded modulations (TCM) and multilevel coded (MLC) modulations which were finally outperformed by the BICM main advantage to naturally welcome the breakthrough capacity achieving codes (turbo-codes, low density parity check codes, LDPCs). The TCM structure involves a joint design of the error correcting code and symbol modulator, the complexity of which explodes for the random structure of turbo-codes or LDPCs. As for MLC, it inherently involves a successive cancellation structure between independent codes, which is sub-optimal with respect to an error correcting code spanning the whole coded bits, when using an iterative decoding approach.

Shannon's information theory teaches us that random codes, for which no decoder can be implemented in practice, asymptotically achieve the channel capacity. Thus, the main strategy has been to use off-the-shelf error correcting codes with a strong algebraic structure that allows practical decoder implementation, and to combine them by introducing an as-random-as possible structure (e.g. with random interleaving). The decoder complexity can be kept low by using belief propagation iterative decoding. One key difficulty is to predict the performance of such error correcting codes, especially in a coded modulation context where even the BICM channel capacity can only be known with approximations. This difficulty is today the main obstacle to extremely good performance, especially for small data packets. As a remark, error correcting codes are most of the time optimized for the binary input additive white Gaussian noise, AWGN, channel case. Such high performance optimizations are then used in the BICM context, which is not a standard binary input AWGN channel, which causes sub-optimality in the BICM context.

Recently (from 2009), a new class of capacity achieving error correcting codes was invented that relies neither on algebraic structure nor on iterative belief propagation, that do not have a random structure, but still provably asymptotically achieve the channel capacity. The polar codes, invented by Arikan [ARI2009], rely on a construction from information theory. By combining, in a divide and conquer approach (like fast Fourier transform for example), parallel polarization channels and using successive cancellation decoding, it can be proved that the equivalent parallel polarization channels are asymptotically (infinite length) either perfect or null (polarization effect), in a proportion equal to the initial channel capacity. The encoding and decoding complexity is limited in number of operations, thanks to the divide-and-conquer structure of the error correcting code. The main challenge is to be able to predict the position of the polarization channels with null capacity, that will carry frozen bits (known to the transmitting device and to the receiving device), since these positions can vary in a seemingly random behavior according to the characteristics of the actual channel targeted for transmission. Only few simple channels allow having an optimal choice of said frozen bits. For the well-known binary input AWGN channel, efficient techniques are known for the determination of the frozen bits positions according to their number (code rate) and to the signal to noise ratio, SNR, of the AWGN channel. Thus, we have at our disposal, from the scientific literature, a polar code toolbox designed for binary input AWGN [BIO2019]. The toolbox is able to provide good performance for any coding rate and data packet length.

Polar codes have been included e.g. in 5G standardization [3GPP38212]. Polar codes not only show high performance on typical AWGN channels but are also very promising for designing coded modulations and for being applied to less known channels. The most important facts on polar codes are:
- polar codes are capacity achieving for infinite data packet length;
- the decoder associated with polar codes involve a serial processing of the bits, which involve that the latency for decoding is linear with the data packet length; this makes polar codes impractical for large packet lengths in latency constrained applications; this is why they were only selected for short data packets in 5G standardization;
- the polar codes have no error floor, which allow to easily predict the performance and attain packet error rates down to $10^{-10}$, which is good for ultra-reliable communications.

From the former points, we can conclude that polar codes are only practical for short data packets, but good only for large data packets, which is contradictory. However, instead of using the initially (and optimal for large data packets) successive cancellation decoding, it has been proposed to generalize such decoder to a list based decoder (a kind of K-first tree search). This algorithm provides a list of candidate survivors instead of a direct estimation of the transmitted data bits of one polarization channel. Then, analysis of polar codes has shown that their minimal distance is weak, but that their second minimal distance is good. Thus, it has been proposed to include a cyclic redundancy check, CRC, in the data packet to allow sorting between the candidates provided by the list decoder. This provides very high increase of performance for short data packets, and makes polar codes providing a better performance/complexity tradeoff than other coding strategies. As of today, the combination of polar codes, CRC and list decoder has not been beaten by other designs of polar codes for short data packets (lower than 8000 data bits).

The polar code structure is based on the chain rule on information theory, which suggests multilevel encoding and decoding with no information loss. MLC modulations also rely on this same concept. Thus, it seems a good strategy to rely on polar codes for MLC modulations, leading into multilevel polar-coded modulations [SEID2013] [ION2014]. Also, the list decoding approach can easily be extended to multilevel coded modulations by passing the lists from one polar code decoder to another. The increase of complexity is limited. There is no need to consider belief propagation algorithms.

However, the main drawback of polar codes is that their design (choice of the frozen bits for a given rate) is very sensitive to the nature of the channel. Thus a polar code designed for a binary input AWGN channel does not exhibit good performance when used with e.g. a binary erasure channel, BEC.

When the channel transition probability is non-trivial, the only possibility to have a good selection of frozen bits is to compute a so-called density evolution, i.e. propagating the transition probabilities within the structure of the error correcting code in order to determine the equivalent channel transition probability at each data bit level. This is already extremely complex in the binary case, and is even more complex in the multilevel modulation case.

REFERENCES

[3GPP38212] 3rd Generation Partnership Project (3GPP), "Multiplexing and channel coding", 3GPP 38.212 V15.3.0, 2018.
[ARI2009] Arikan, E. (July 2009). "Channel polarization: a method for constructing capacity-achieving codes for symmetric binary-input memoryless channels", IEEE Transactions on Information Theory.
[BIO2019] V. Bioglio, C. Condo, I. Land, "Design of Polar Codes in 5G New Radio", arXiv:1804.04389v2.
[ION2014] C. I. Ionita, M. Mansour, J. C. Roh, and S. Hosur, "On the design of binary polar codes for high-order modulation", Proceedings of IEEE Global Communications Conference, Austin, TX, USA, December 2014.
[SEID2013] M. Seidl, A. Schenk, C. Stierstorfer, and J. B. Huber, "Multilevel polar-coded modulation", Proceedings of IEEE International Symposium on Information Theory, Munich, Germany, January 2013.

SUMMARY OF INVENTION

The present disclosure aims at proposing a multilevel polar-coded modulation scheme in a way to keep the implementation simple with high performance, in some embodiments at least. In particular, the present disclosure aims at proposing a multilevel polar-coded modulation scheme that can provide good performance even when the channel is not an AWGN channel, and even with short data packets, which are of particular interest in the context of "Internet of Things" (IoT) applications.

For this purpose, and according to a first aspect, the present disclosure relates to a method for transmitting a data stream from a transmitting device to a receiving device, the data stream comprising m data sub-streams, said method comprising:

encoding the data sub-streams with respective polar codes, such as to produce m polar-encoded data sub-streams, modulating the m polar-encoded data sub-streams onto symbols of a multilevel modulation comprising m levels defining $2^m$ different symbols in a complex plane, according to a predetermined labeling function Z which bijectively associates a symbol to a set $c_1, \ldots, c_m$ of m bits from respective polar-encoded data sub-streams, such that successive sets of m bits from respective polar-encoded data sub-streams are converted into successive symbols forming a symbol stream, transmitting the symbol stream to the receiving device.

The $2^m$ symbols of the multilevel modulation are distributed in the complex plane such that they are regularly spaced along the real axis and the complex axis by a spacing factor K, and the predetermined labeling function Z is such that:

$$\Phi(Z) < 1.7^m \times (0.0425 \times m - 0.06)$$

expression in which:

$$\Phi(Z) = \sum_{i=1}^{m} \sum_{\{c_1, \ldots, c_m\}} \sum_{\{c'_i, \ldots, c'_m\} \setminus (c_i, \ldots, c_m)} e^{-\frac{4}{K^2}|Z(c_1, \ldots, c_m) - Z(c_1, \ldots, c_{i-1}, c'_i, \ldots, c'_m)|^2}$$

In specific embodiments, the transmitting method can further comprise one or more of the following features, considered either alone or in any technically possible combination.

In a specific embodiment, each of the m polar codes used is a polar code designed for a binary input additive white Gaussian noise, AWGN, channel.

In a specific embodiment, the respective code rates of the m polar codes are adapted to propagation conditions.

In a specific embodiment, the transmitting method comprises:

determining signal to noise ratios, SNRs, experienced by each data sub-stream during the propagation from the transmitting device to the receiving device, selecting the code rates of each of the m polar codes used based on the SNRs experienced by each data sub-stream.

In a specific embodiment, the data sub-stream and/or each of the data sub-streams include an error detection code.

In a specific embodiment, the multilevel modulation is a 16QAM modulation, and the labeling function is given by table 1 below, or by table 1 modified by rotating the constellation of symbols in the complex plane by an angle multiple of 90°, and/or by applying an axial reflection to the constellation of symbols with respect to the real axis, and/or by applying an axial reflection to the constellation of symbols with respect to the complex axis, and/or by inverting all the bit values.

In a specific embodiment, the multilevel modulation is a 64QAM modulation, and the labeling function is given by table 2 below, or by table 2 modified by rotating the constellation of symbols in the complex plane by an angle multiple of 90°, and/or by applying an axial reflection to the constellation of symbols with respect to the real axis, and/or by applying an axial reflection to the constellation of symbols with respect to the complex axis, and/or by inverting all the bit values.

In a specific embodiment, the multilevel modulation is a 256QAM modulation, and the labeling function is given by table 3 below, or by table 3 modified by rotating the constellation of symbols in the complex plane by an angle multiple of 90°, and/or by applying an axial reflection to the constellation of symbols with respect to the real axis, and/or by applying an axial reflection to the constellation of symbols with respect to the complex axis, and/or by inverting all the bit values.

According to a second aspect, the present disclosure relates to a computer program product comprising instructions which, when executed by a processor, configure said processor to carry out a transmitting method according to any one of the embodiments of the invention.

According to a third aspect, the present disclosure relates to a computer-readable storage medium comprising instructions which, when executed by a processor, configure said processor to carry out a transmitting method according to any one of the embodiments of the invention.

According to a fourth aspect, the present disclosure relates to a device for transmitting a data stream to a receiving device, comprising a processing circuit configured to carry out a transmitting method according to any one of the embodiments of the invention.

According to a fifth aspect, the present disclosure relates to a method for receiving a data stream by a receiving device, said data stream comprising m data sub-streams, comprising:

receiving a symbol stream including the data stream from a transmitting device, the symbol stream including symbols of a multilevel modulation comprising m levels defining $2^m$ different symbols in a complex plane, demodulating the symbols of the symbol stream in order to produce m polar-encoded data sub-streams, by applying an inverse function of a predetermined labeling function Z which bijectively associates a symbol to a set $c_1, \ldots, c_m$ of m bits from respective polar-encoded data sub-streams, decoding successively the m polar-encoded data sub-streams such as to produce m data sub-streams, by applying respective polar-code decoders.

The $2^m$ symbols of the multilevel modulation used are distributed in the complex plane such that they are regularly spaced along the real axis and the complex axis by a spacing factor K, and the predetermined labeling function Z is such that:

$$\Phi(Z) < 1.7^m \times (0.0425 \times m - 0.06)$$

expression in which:

$$\Phi(Z) = \sum_{i=1}^{m} \sum_{\{c_1,\ldots,c_m\}} \sum_{\{c'_i,\ldots,c'_m\} \setminus (c_i,\ldots,c_m)} e^{-\frac{4}{K^2} |Z(c_1,\ldots,c_m) - Z(c_1,\ldots,c_{i-1},c'_i,\ldots,c'_m)|^2}$$

In specific embodiments, the receiving method can further comprise one or more of the following features, considered either alone or in any technically possible combination.

In a specific embodiment, each of the m polar code decoders used is designed for decoding a polar code designed for a binary input additive white Gaussian noise, AWGN, channel.

In a specific embodiment, each polar-code decoder used is a list decoder.

According to a sixth aspect, the present disclosure relates to a computer program product comprising instructions which, when executed by a processor, configure said processor to carry out a receiving method according to any one of the embodiments of the invention.

According to a seventh aspect, the present disclosure relates to a computer-readable storage medium comprising instructions which, when executed by a processor, configure said processor to carry out a receiving method according to any one of the embodiments of the invention.

According to an eighth aspect, the present disclosure relates to a device for receiving a data stream from a transmitting device, comprising a processing circuit configured to carry out a receiving method according to any one of the embodiments of the invention.

The invention will be better understood upon reading the following description, given as an example that is in no way limiting, and made in reference to the figures which show:

DESCRIPTION OF EMBODIMENTS

In these figures, references identical from one figure to another designate identical or analogous elements. For reasons of clarity, the elements shown are not to scale, unless explicitly stated otherwise.

As indicated above, the present disclosure relates to a multilevel polar-coded modulation scheme.

Figure 1:
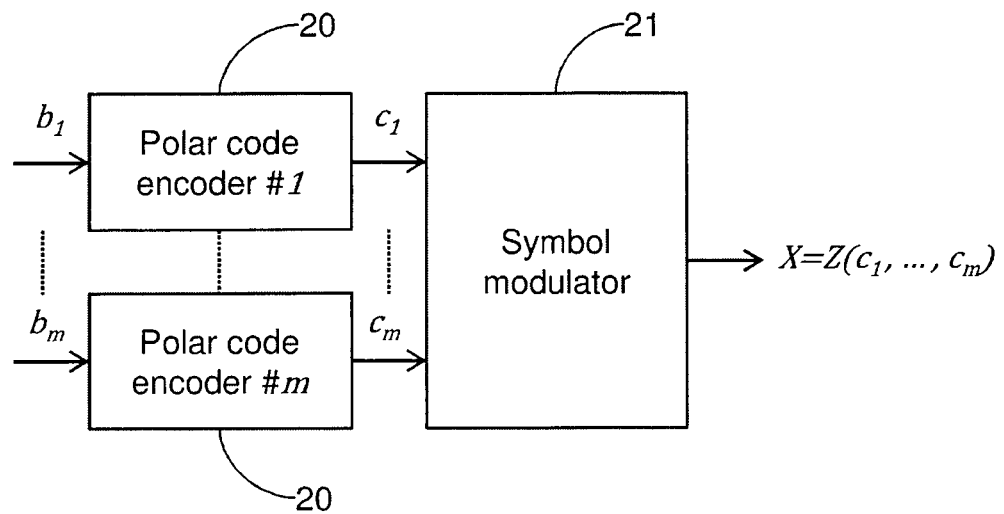
FIG. 1 is a schematic representation of an exemplary multilevel polar-coded modulation scheme.

FIG. 1 represents schematically a multilevel polar-coded modulation scheme. It is assumed, in a non-limiting manner, that the multilevel modulation comprises m levels, implying that the corresponding constellation comprises $2^m$ symbols in the complex plane. Preferably, m is higher than or equal to 4 (m≥4). Preferably, m is a power of 2, and is for instance equal to 4, equal to 6, equal to 8, etc.

As illustrated by FIG. 1, each level comprises a polar code encoder 20, such that m polar code encoders are used in parallel on the m different levels of the multilevel modulation. The m polar code encoders can be either identical or different. In preferred optional embodiments, that will be discussed hereinafter, the respective code rates of the m polar code encoders can be dynamically adapted to the propagation conditions, potentially resulting in the polar code encoders using different code rates.

As illustrated by FIG. 1, $b_i$ represents data bits to be encoded by the polar code encoder 20 of the i-th level, that produces polar-encoded data bits $c_i$. Each level of polar-encoded data bits is then fed to a symbol modulator 21 that produces a stream of symbols. The constellation modulator takes one polar-encoded data bit per level, i.e. a total of m bits $(c_1, \ldots, c_m)$, and outputs one symbol $X = Z(c_1, \ldots, c_m)$ according to a predetermined labeling function Z. A symbol X is defined by a set of coordinates in real and complex dimensions and, as discussed above, the constellation of symbols comprises $2^m$ different symbols in the complex plane. The labeling function $Z(c_1, \ldots, c_m)$ allows to make a one-to-one mapping between a set of m encoded data bits $(c_1, \ldots, c_m)$ and a symbol $X=Z(c_1, \ldots, c_m)$. Successive sets of m polar-encoded data bits $(c_1, \ldots, c_m)$ thus produce successive symbols, forming a symbol stream, i.e. a vector of symbols transmitted on respective resources.

In the sequel, $c_i$ denotes one polar-encoded data bit of the i-th level. If necessary to distinguish different polar-encoded data bits of a same level, a second subscript is used such that $c_{i,t}$ denotes the polar-encoded data bit of the i-th level that is used to produce the t-th symbol transmitted on the t-th resource. Also, $b_i$ denotes one data bit of the i-th level, and $\overline{b}_i$ corresponds to a vector comprising several data bits of the i-th level. Similarly, X and Y denote respectively one symbol and one observation. If necessary to distinguish different symbols and different observations, a subscript is used such that $X_t$ and $Y_t$ denote respectively the t-th symbol and the t-th observation, transmitted and observed on the t-th resource. $\overline{X}$ and $\overline{Y}$ denote respectively a vector comprising T different symbols $X_t$ ($\overline{X}=(X_1, \ldots, X_T)$) and a vector comprising T different observations $Y_t$ ($\overline{Y}=(Y_1, \ldots, Y_T)$). It is noted that the T resources can correspond to different time slots, to different frequencies (e.g. different subcarriers of an orthogonal frequency division multiplex, OFDM, symbol), different spreading codes, etc., or any combination thereof. Each symbol $X_t$ is obtained based on a set of m polar-encoded data bits $(c_{1,t}, \ldots, c_{m,t})$. The vector $(c_{i,1}, \ldots, c_{i,T})$ comprising the T polar-encoded data bits for the i-th level is denoted $\overline{c}_i$. Each vector $\overline{c}_i$ of polar-encoded data bits is obtained by encoding the vector $\overline{b}_i$ of data bits with a polar code. Each vector $\overline{b}_i$ comprises a number of data bits that depends on the code rate of polar code encoder of the i-th level, and that can vary from one level to another.

The vector $\overline{X}$ of symbols is then transmitted by a transmitting device 30 through a channel and an observation $\overline{Y}$ of the vector $\overline{X}$ of symbols is obtained at a receiving device 40. The channel modifies each symbol $X=Z(c_1, \ldots, c_m)$ into the observation Y according to a statistical behavior characterized by the transition probability $p(Y|c_1, \ldots, c_m)$ of the channel. For example, when considering an additive white Gaussian noise, AWGN, channel, the observation Y is the result of $Z(c_1, \ldots, c_m)$ plus a noise following a Gaussian distribution.

In order to properly design a multilevel polar-coded modulation, it is of interest to first characterize the model from an information theory standpoint. In general, the channel capacity is by definition the maximization of the channel mutual information $I(X; Y)$, i.e. without taking into account any structure for the transmitting device 30 or the receiving device 40. When adding elements in the encoding/decoding structure, the mutual information decreases. For example, in an AWGN channel, by constraining the symbols to belong to a finite constellation, the mutual information $I(X; Y)$ is lower than with a continuous Gaussian input which maximizes the channel mutual information.

Further to constraining each symbol X to belong to a finite constellation, we constrain the system to a multilevel modulation structure. The one-to-one mapping between $X=Z(c_1, \ldots, c_m)$ and $(c_1, \ldots, c_m)$ allows to now consider $I(c_1, \ldots, c_m; Y)$ without any loss. By using the chain rule, we obtain:

$$I(X;Y)=I(c_1, \ldots, c_m; Y)=\Sigma_{i=1}^{m} I(c_i; Y|c_1, \ldots, c_{i-1})$$

expression in which $I(c_i; Y|c_1, \ldots, c_{i-1})$ corresponds to the conditional mutual information.

We can observe that by associating a code rate $I(c_i; Y|c_1, \ldots, c_{i-1})$ to the i-th polar-coded level, no loss of information is observed if successive cancellation decoding is performed at the receiving device (which is suggested by the knowledge of $c_1, \ldots, c_{i-1}$ when decoding $c_i$). By definition of the mutual information, no error occurs if the code rate is adapted to the equivalent level channel. An equivalent level channel corresponds to a virtual channel experienced by a single polar-encoded data sub-stream, the m polar-encoded data sub-streams being transmitted on m parallel equivalent level channels. In practice, when using a finite length coding scheme, errors occur and propagate from one level to another when using a successive decoding scheme. This error propagation should be as limited as possible, by design.

We assume that the bits $c_i$ are equiprobable, i.e., that the probability $p(c_i=0)=p(c_i=1)=0.5$, such that the conditional mutual information can be expressed as:

$$I(c_i; Y|c_1, \ldots, c_{i-1}) = E_{c_1, \ldots, c_m} E_{Y|c_1, \ldots, c_m} \left[ 1 - \log_2 \left( 1 + \frac{\sum_{\{c'_{i+1}, \ldots, c'_m\}} p(Y|c_1, \ldots, c_{i-1}, 1-c_i, c'_{i+1}, \ldots, c'_m)}{\sum_{\{c'_{i+1}, \ldots, c'_m\}} p(Y|c_1, \ldots, c_{i-1}, c_i, c'_{i+1}, \ldots, c'_m)} \right) \right]$$

expression in which:

$E_{c_1, \ldots, c_m}$ is an expectation over all possible polar-encoded data bits $\{c_1, \ldots, c_m\}$, or equivalently on all possible constellation symbols $\{X\}$;

$E_{Y|c_1, \ldots, c_m}$ is an expectation over all possible observations Y when the transmitted symbol $Z(c_1, \ldots, c_m)$ is known; it is fully characterized by the transition probability $p(Y|Z(c_1, \ldots, c_m))$;

the sum $\Sigma_{\{c'_{i+1}, \ldots, c'_m\}}$ is performed over all the $2^{m-i}$ sets of polar-encoded data bits $\{c'_{i+1}, \ldots, c'_m\}$; this marginalization makes appear the transition probabilities $p(Y|Z(c_1, \ldots, c_{i-1}, c_i, c'_{i+1}, \ldots, c'_m))$ or $p(Y|Z(c_1, \ldots, c_{i-1}, 1-c_i, c'_{i+1}, \ldots, c'_m))$;

$Z(c_1, \ldots, c_{i-1}, c_i, c'_{i+1}, \ldots, c'_m)$ is the symbol with the i first polar-encoded data bits in their labeling fixed to $(c_1, \ldots, c_i)$, the same values as the i first polar-encoded data bits of the labeling of $Z(c_1, \ldots, c_m)$ selected in the expectation $E_{c_1, \ldots, c_m}$; and the last (m−i) polar-encoded data bits of the labeling of $Z(c_1, \ldots, c_{i-1}, c_i, c'_{i+1}, \ldots, c'_m)$ are set by the configuration $(c'_{i+1}, \ldots, c'_m)$ selected in the sum $\Sigma_{\{c'_{i+1}, \ldots, c'_m\}}$; thus, $Z(c_1, \ldots, c_{i-1}, c_i, c'_{i+1}, \ldots, c'_m)$ is one of the multilevel modulation symbols, and $p(Y|Z(c_1, \ldots, c_{i-1}, c_i, c'_{i+1}, \ldots, c'_m))$ can be easily computed by the knowledge of the observation Y and of the channel transition probability;

similarly, $Z(c_1, \ldots, c_{i-1}, 1-c_i, c'_{i+1}, \ldots, c'_m)$ is the constellation symbol with labeling having the (i−1) first polar-encoded data bits equal to $(c_1, \ldots, c_{i-1})$, the i-th polar-encoded data bit value is $(1-c_i)$, and the last (m−i) polar-encoded data bits values are $(c'_{i+1}, \ldots, c'_m)$.

Figure 2:
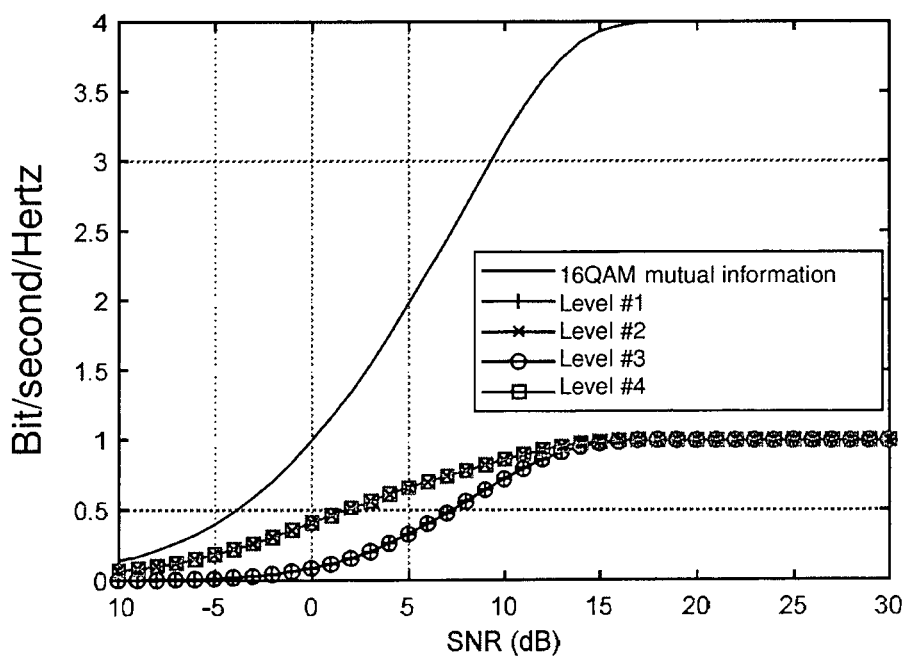
FIG. 2 is a plot representing the mutual information for a 16QAM modulation using a Gray labeling function, and the distribution of the mutual information between the 4 bit levels.
Figure 3:
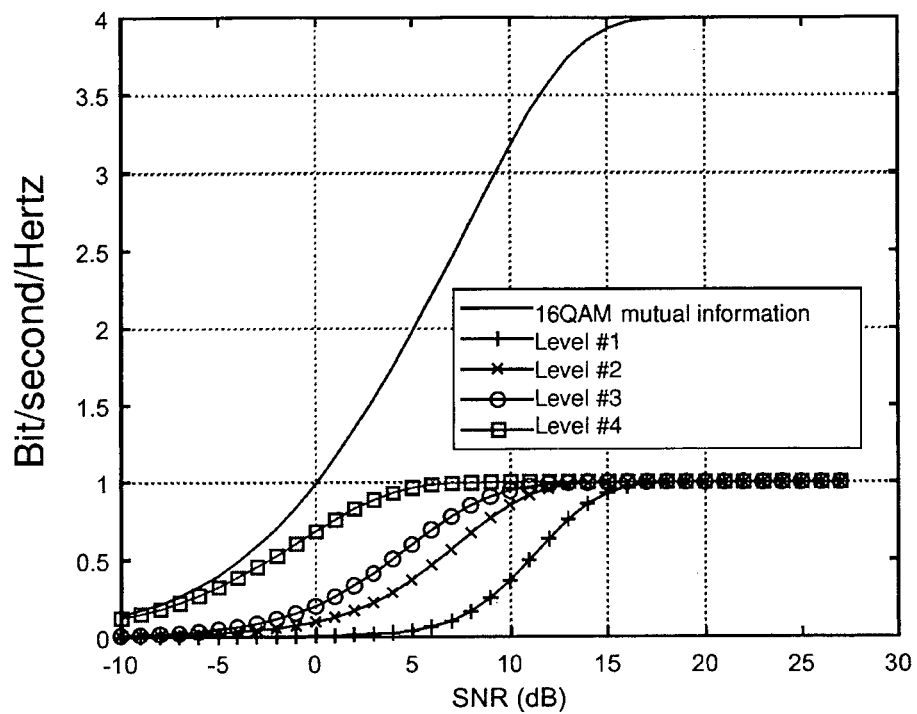
FIG. 3 is a plot representing the mutual information for a 16QAM modulation using a random labeling function, and the distribution of the mutual information between the 4 bit levels.

The chain rule decomposition of the Gray labeling for a 16QAM (16-level QAM) is shown in FIG. 2. The sum of the 4 plots associated each to one of the 4 bit levels is indeed equal to the mutual information of the 16QAM constellation without constraint on the polar-coding scheme. We can observe that, since the Gray labeling is independent and the same on the real and imaginary parts, the mutual information of bits 1 and 3 (i.e. of the levels 1 and 3 of the multilevel modulation) and bits 2 and 4 (i.e. of the levels 2 and 4) are equal. The chain rule decomposition of a random labeling for a 16QAM is shown in FIG. 3. We can observe that, for a given signal to noise ratio, SNR, the rate splitting is different from the one of Gray labeling. Yet, the sum of the rates is still equal to the mutual information of the 16QAM constellation.

Hence, it is important to note that, from the mutual information perspective, only the vector $\overline{X}$ of symbols has an impact on the performance. The labeling function itself does not improve or degrade the overall theoretical performance. It just changes the repartition of the rate between the parallel levels of the multilevel polar-coded modulation. This remark is important as it highlights that any labeling function performs theoretically the same in view of information theory.

However, we will see later that, when combined with a practical polar code, this remark is not true anymore. In other words, when considering practical polar codes in a multilevel polar-coded modulation context, the labeling can influence the overall actual performance, such that optimization of the labeling function can be made by taking into account the polar coding strategy of each parallel level of the multilevel polar-coded modulation.

In the sequel, we assume that the channel is memory-less. Hence, the channel effect is independent from one transmission resource to another (e.g., additive white Gaussian noise is usually independent in time).

Thus, the likelihood $p(\overline{Y}|\overline{b}_1, \ldots, \overline{b}_m)$ can be decomposed through the T resources used for transmitting the symbol vector $\overline{X}=(X_1, \ldots, X_T)$, as follows:

$$p(\overline{Y}|\overline{b}_1, \ldots, \overline{b}_m) = \prod_{t=1}^{T} p(Y_t|\overline{b}_1, \ldots, \overline{b}_m)$$

Then, by using the fact that the encoder converts the vector of data bits $\overline{b}_i$ into a vector of polar-encoded data bits $\overline{c}_i=(c_{i,1}, \ldots, c_{i,T})$, we can write:

$$p(\overline{Y}|\overline{b}_1, \ldots, \overline{b}_m) = \prod_{t=1}^{T} p(Y_t|c_{1,t}, \ldots, c_{m,t})$$

This involves that the relationship between $\overline{Y}$ and $\overline{b}_1, \ldots, \overline{b}_m$ can be analyzed resource per resource by working on $Y_t$ and $(c_{1,t}, \ldots, c_{m,t})$, and the associated symbol $X_t=Z(c_{1,t}, \ldots, c_{m,t})$. It is recalled that the role of the labeling function Z is to determine which symbol is uniquely associated with a polar-encoded data bit vector $(c_{1,t}, \ldots, c_{m,t})$. This allows reducing the complexity of the decoder by considering a symbol-to-bit demodulation (i.e. inverse function of the labeling function Z) performed independently on each resource.

It is assumed that the decoder successively decodes the first level (i.e. the level with index 1), then the second level (i.e. the level with index 2), etc., until the last level (i.e. the level with index m). For instance, the decoder of the multilevel polar-coded modulation with list decoding can typically involve the following steps, performed successively for each level, from the level with index 1 to the level with index m, which include for the i-th level:

obtain the data bit vectors $\overline{b}_1, \ldots, \overline{b}_{i-1}$ associated to each surviving path of the list decoding procedure;

re-encode and obtain the polar-encoded data bits according to the polar code encoder of each level (this can also be done during the decoding process of $\overline{b}_1, \ldots, \overline{b}_{i-1}$);

for each transmission resource with index t with observation $Y_t$, compute the likelihoods $p(Y_t|c_{1,t}, \ldots, c_{i-1,t}, 1, c'_{i+1}, \ldots, c'_m)$ and $p(Y_t|c_{1,t}, \ldots, c_{i-1,t}, 0, c'_{i+1}, \ldots, c'_m)$ for the obtained re-encoded data bits $(c_{1,t}, \ldots, c_{i-1,t})$ and for all the $2^{m-i}$ possible configurations $\{c'_{i+1}, \ldots, c'_m\}$, compute the following log-likelihood ratios, for all indexes t:

$$LLR_{i,t} = \log\left(\frac{\sum_{\{c'_{i+1}, \ldots, c'_m\}} p(Y_t|c_{1,t}, \ldots, c_{i-1,t}, 0, c'_{i+1}, \ldots, c'_m)}{\sum_{\{c''_{i+1}, \ldots, c''_m\}} p(Y_t|c_{1,t}, \ldots, c_{i-1,t}, 1, c''_{i+1}, \ldots, c''_m)}\right)$$

expression in which $\Sigma_{\{c'_{i+1}, \ldots, c'_m\}}$ corresponds to the sum over the $2^{m-i}$ possible configurations $\{c'_{i+1}, \ldots, c'_m\}$, and $\Sigma_{\{c''_{i+1}, \ldots, c''_m\}}$ corresponds to the sum over the $2^{m-i}$ possible configurations $\{c''_{i+1}, \ldots, c''_m\}$;

feed the input of the decoder of the i-th level with the last cumulated metric resulting from the decoding of the (i−1)-th level for each list decoding survivor, and perform the decoding to obtain the data bit vector $\overline{b}_i$ for each surviving path and the associated cumulated metric.

It is noted that the above steps are only given for exemplary purposes, and that the decoding can be performed differently. In particular, it is possible, in other embodiments, to apply a simple successive decoding scheme without list decoding, i.e. by computing only a single survivor for each level. More generally speaking, the present disclosure is not limited to a specific decoding process, and the choice of a specific decoding process merely constitutes an exemplary embodiment of the present disclosure.

However, the present disclosure relies on the assumption that the different levels are decoded successively at the decoder, with the level with index 1 being decoded first and the level with index m being decoded last.

Also, the above exemplary embodiment of a successive decoding scheme has been given in order to highlight the structure of the log-likelihood ratios $LLR_{i,t}$, which is not expected to vary significantly from a successive decoding scheme to another, and which help understanding why the labeling function can be optimized in order to increase the overall actual performance of the system, when considering practical implementations.

As previously said, practical implementations of polar code encoders and decoders correspond to polar codes designed for binary input AWGN channels. Such polar codes expect to be used on an AWGN channel with binary input, and consequently expect to have log likelihood ratios $LLR_{i,t}$ at the input of the polar code decoder that follow a Gaussian distribution.

Figure 4:
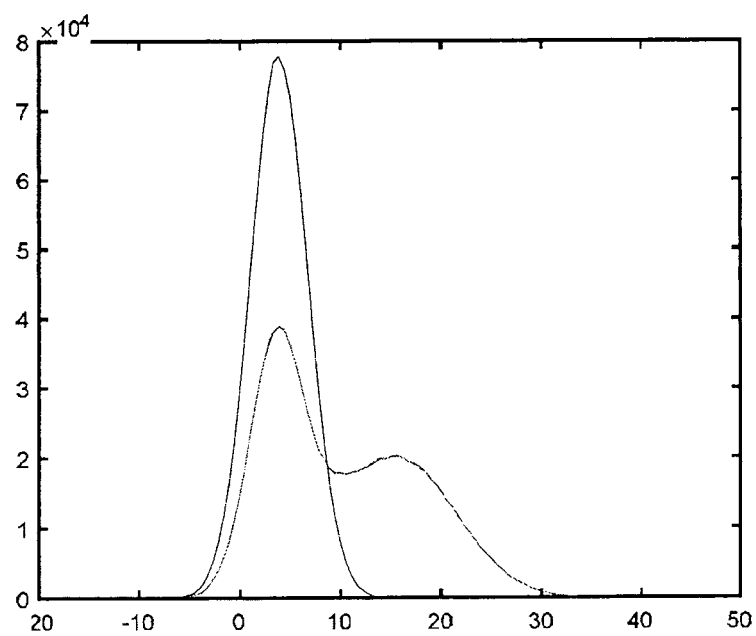
FIG. 4 is a plot representing the log likelihood ratio distribution at the input of the different polar code decoders of a multilevel polar-coded modulation scheme, when using a Gray labeling function.

However, when using a high order multilevel coded modulation (m≥4) with a Gray labeling, at least one of the m polar code decoders experiences an input log likelihood ratio distribution which is not Gaussian, such as illustrated in FIG. 4. This leads to degraded performance.

The inventors have noticed that the labeling function influences the input log likelihood ratio distribution of the different levels, and that some labeling functions outperform the conventional Gray labeling when considering a multilevel polar-coded modulation using an off-the-shelf polar codes designed for binary input AWGN channels.

In particular, the inventors have discovered that it is possible to find labeling functions which provide input log likelihood ratio distributions that are substantially Gaussian for all the levels of the multilevel polar-coded modulation. Hence, despite not influencing the mutual information, the labeling function does influence the overall actual performance if it enables providing the inputs of the different polar code decoders with log likelihood ratios that tend to follow the expected Gaussian distributions.

For that purpose, the inventors have discovered that the following function could be used to identify suitable labeling functions:

$$\Phi(Z) = \sum_{i=1}^{m} \sum_{(c_1,\ldots,c_m)} \sum_{(c'_i,\ldots,c'_m)\setminus(c_i,\ldots,c_m)} e^{-\frac{4}{K^2}|Z(c_1,\ldots,c_m)-Z(c_1,\ldots,c_{i-1},c'_i,\ldots,c'_m)|^2} \quad (1)$$

In the expression (1) above:
- $e^x$ corresponds to the exponential function applied to the real number x;
- $|z|$ corresponds to the modulus (or magnitude) of the complex number z (i.e. $|z|=\sqrt{z_1^2+z_2^2}$ if $z=z_1+j\times z_2$, with $z_1$, $z_2$ being real numbers and j being the imaginary unit);
- K is a spacing factor of the symbols in the complex plane;
- $\Sigma_{\{c_1,\ldots,c_m\}}$ is a sum over the $2^m$ possible values of the vector $(c_1, \ldots, c_m)$, bijectively associated to the $2^m$ symbols of the constellation by the labeling function Z;
- $\Sigma_{\{c'_i,\ldots,c'_m\}\setminus(c_i,\ldots,c_m)}$ is a sum over the $(2^{m-i+1}-1)$ possible values of the vector $(c'_i, \ldots, c'_m)$ when excluding the specific value $(c_i, \ldots, c_m)$ as currently set by the sum $\Sigma_{\{c_1,\ldots,c_m\}}$, the value of i being set by the sum $\Sigma_{i=1}^m$; for completeness, it is emphasized that, for i=1, $Z(c_1, \ldots, c_{i-1}, c'_i, \ldots, c'_m)=Z(c'_1, \ldots, c'_m)$ in said sum and that, for i=2, $Z(c_1, \ldots, c_{i-1}, c'_i, \ldots, c'_m)=Z(c_1, c'_2, \ldots, c'_m)$ in said sum, etc.

More specifically, regarding the spacing factor K, defined in expression (1) above, it implies that the $2^m$ symbols of the constellation of the multilevel modulation are distributed in the complex plane such that they are regularly spaced along the real axis and the complex axis by said spacing factor K. For instance, if the sum of the $2^m$ symbols is equal to zero (i.e. the $2^m$ symbols are centered around (0,0) the center of the complex plane), then the $2^m$ symbols are in the following set:

$$\left\{\left(\pm K\times\left(k-\frac{1}{2}\right), \pm K\times\left(k'-\frac{1}{2}\right)\right), k, k' \in \mathbb{N} \cap [1, 2^{m/2-1}]\right\}.$$

expression in which $\mathbb{N}$ corresponds to the set of natural integers, such that:
- for m=4 (16QAM modulation): k, k'∈ {1, 2};
- for m=6 (64QAM modulation): k, k'∈ {1, 2, 3, 4};
- for m=8 (256QAM modulation): k, k'∈ {1, 2, 3, 4, 5, 6, 7, 8};
- etc.

In general, the function Φ is a function that produces a value representative of fairness between the elementary distances $|Z(c_1, \ldots, c_m)-Z(c_1, \ldots, c_{i-1}, c'_i, \ldots, c'_m)|^2$ playing a role in each log likelihood ratio $LLR_{i,t}$ production for each level of the multilevel coded modulation. By optimizing the function Φ, i.e. by minimizing the function Φ, it is possible to obtain a labeling function Z for which the log likelihood ratios $LLR_{i,t}$ will tend to follow a Gaussian distribution for all the levels of the multilevel coded modulation.

As a remark, this function Φ does not take into account the channel transition probabilities. It helps determining labeling functions mimicking the log likelihood ratio distribution of a binary input AWGN channel regardless the actual channel. This is a key feature of our approach, since the labeling can be used in a context where the channel is unknown at the transmitting device 30.

As indicated above, this function Φ assumes that the different levels are decoded successively at the receiving device 40, with the level with index 1 being decoded first and the level with index m being decoded last.

In order to optimize the function Φ, it is for instance possible to execute a genetic-like algorithm, for example by executing the following steps:
- initialize a labeling function Z; for example, it is possible to start from the Gray labeling or any random labeling;
- compute BestMetric=Φ(Z);
- repeat the following steps until a stopping criterion is verified:

```
for all j = 1 ••• m
  for all {c_1, ••• , c_m}
    copy Z into Z'
    find the symbols with the labeling (c_1, ••• , c_j = 0, ... , c_m) and (c_1, ... , c_j = 1, ... , c_m) and switch their labeling in Z'
    compute Metric = Φ(Z')
    if Metric < BestMetric
      save Z' into Zsav
      set BestMetric = Metric
    end
  end
  set Z = Zsav
end
```

For instance, the stopping criterion can be considered to be verified when no improvement of BestMetric is observed between two iterations. Of course other optimization algorithms can be considered and other stopping criteria can be used for optimizing the function Φ.

Without necessarily optimizing the function Φ, i.e. without necessarily finding the specific labeling function that minimizes the function Φ, the inventors have observed that the labeling functions satisfying the following criterion are good in the sense that, for such labeling functions, the log likelihood ratios $LLR_{i,t}$ tend to follow a Gaussian distribution for all the levels of the multilevel coded modulation:

$$\Phi(Z)<1.7^m\times(0.0425\times m-0.06) \quad (2)$$

expression in which m, as defined previously, corresponds to the number of levels of the multilevel modulation. Of course, the conventional Gray labeling function, inter alia, does not satisfy the expression (2) since the log likelihood ratios it produces do not follow a Gaussian distribution for all levels.

Hence:
- for m=4 (16QAM modulation): g(4)≈0.9187;
- for m=6 (64QAM modulation): g(6)≈4.7068;
- for m=8 (256QAM modulation): g(8)≈19.5321;
- etc.

Table 1 gives an example of labeling function Z that verifies the expression (2) above, in the case of m=4 (16QAM modulation). In table 1, j corresponds to the imaginary unit ($j^2=1$).

TABLE 1

Example of 16 QAM labeling function

| $(c_1, \ldots, c_m)$ | $Z(c_1, \ldots, c_m) \times \dfrac{2}{K}$ |
|---|---|
| 0000 | +3−1j |
| 1000 | +3−3j |
| 0100 | −3−3j |
| 1100 | −3−1j |
| 0010 | −1−1j |
| 1010 | −1−3j |
| 0110 | +1−3j |
| 1110 | +1−1j |
| 0001 | −3+1j |
| 1001 | −1+1j |
| 0101 | +1+1j |
| 1101 | +3+1j |
| 0011 | +3+3j |
| 1011 | +1+3j |
| 0111 | −1+3j |
| 1111 | −3+3j |

Figure 5:
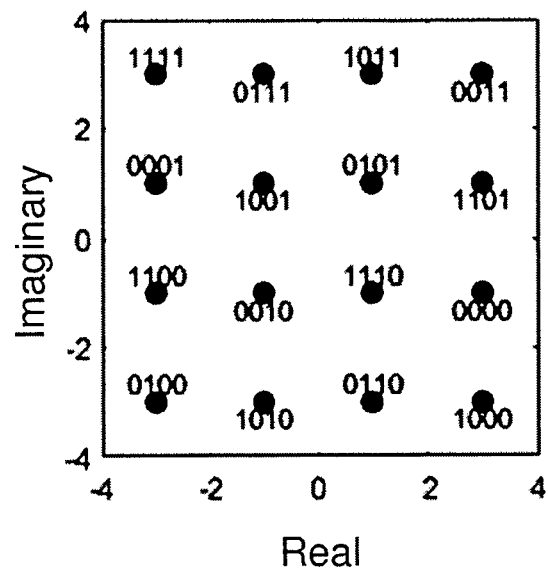
FIG. 5 is a plot representing a preferred embodiment of a 16QAM labeling function.

FIG. 5 represents the labeling function Z given by table 1 in the complex plane. In FIG. 5, K is assumed to be equal to 2. It should be noted that a rotation of the constellation represented in FIG. 5 by a multiple of 90°, or an axial reflection of said constellation with respect to the real axis, or an axial reflection of said constellation with respect to the complex axis, or an inversion of all the bit values, or any combination thereof, does not modify the value of $\Phi(Z)$ and therefore yields a labeling function that is equally good.

Table 2 gives an example of labeling function Z that verifies the expression (2) above, in the case of m=6 (64QAM modulation).

TABLE 2

Example of 64 QAM labeling function

| $(c_1, \ldots, c_m)$ | $Z(c_1, \ldots, c_m) \times \dfrac{2}{K}$ |
|---|---|
| 000000 | +5−7j |
| 100000 | +5−5j |
| 010000 | +3−5j |
| 110000 | +3−7j |
| 001000 | −7−7j |
| 101000 | −3−5j |
| 011000 | +1−3j |
| 111000 | −5−7j |
| 000100 | −3−7j |
| 100100 | −7−5j |
| 010100 | −1−5j |
| 110100 | −1−7j |
| 001100 | +1−7j |
| 101100 | +1−5j |
| 011100 | +7−5j |
| 111100 | +7−7j |
| 000010 | −3−3j |
| 100010 | −1−3j |
| 010010 | −7−3j |
| 110010 | −5−3j |
| 001010 | +5−3j |
| 101010 | +7−3j |
| 011010 | −5−5j |
| 111010 | +3−3j |
| 000110 | −7−1j |
| 100110 | +3−1j |
| 010110 | +5−1j |
| 110110 | −1−1j |
| 001110 | +1−1j |
| 101110 | −5−1j |
| 011110 | −3−1j |
| 111110 | +7−1j |
| 000001 | −3+3j |
| 100001 | +5+1j |
| 010001 | −1+1j |
| 110001 | −1+3j |
| 001001 | +1+3j |
| 101001 | +1+1j |
| 011001 | −5+1j |
| 111001 | +3+3j |
| 000101 | +3+1j |
| 100101 | −5+3j |
| 010101 | −7+3j |
| 110101 | −7+1j |
| 001101 | +7+1j |
| 101101 | +7+3j |
| 011101 | +5+3j |
| 111101 | −3+1j |
| 000011 | +7+5j |
| 100011 | −5+7j |
| 010011 | −7+7j |
| 110011 | +5+5j |
| 001011 | −5+5j |
| 101011 | +7+7j |
| 011011 | +5+7j |
| 111011 | −7+5j |
| 000111 | −3+7j |
| 100111 | +1+5j |
| 010111 | +3+5j |
| 110111 | −1+7j |
| 001111 | +1+7j |
| 101111 | −3+5j |
| 011111 | −1+5j |
| 111111 | +3+7j |

Figure 6:
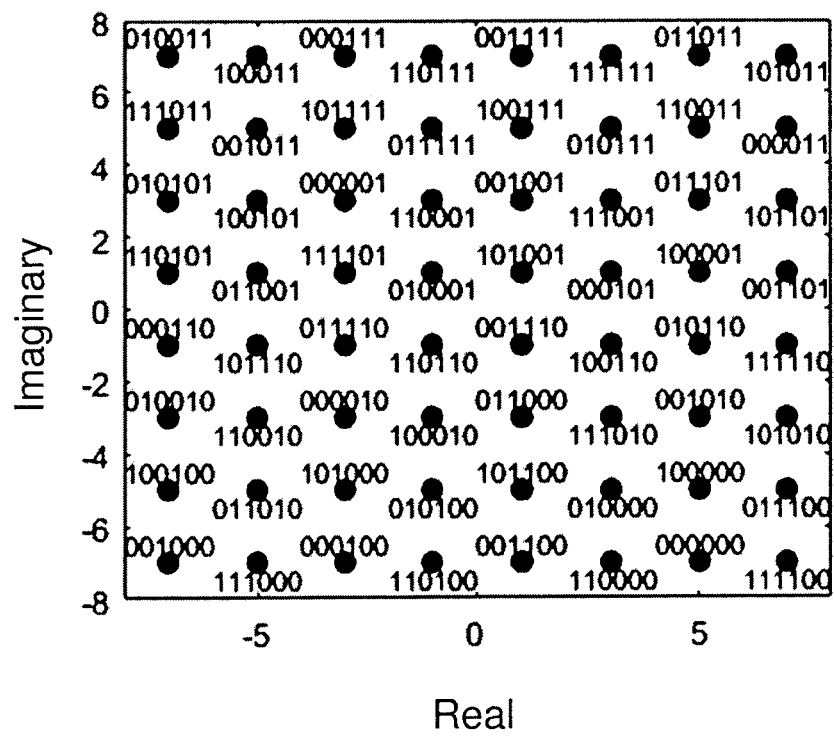
FIG. 6 is a plot representing a preferred embodiment of a 64QAM labeling function.

FIG. 6 represents the labeling function Z given by table 2 in the complex plane. In FIG. 6, K is assumed to be equal to 2. It should be noted that a rotation of the constellation represented in FIG. 6 by a multiple of 90°, or an axial reflection of said constellation with respect to the real axis, or an axial reflection of said constellation with respect to the complex axis, or an inversion of all the bit values, or any combination thereof, does not modify the value of $\Phi(Z)$ and therefore yields a labeling function that is equally good.

Table 3 gives an example of labeling function Z that verifies the expression (2) above, in the case of m=8 (256QAM modulation).

TABLE 3

Example of 256 QAM labeling function

| $(c_1, \ldots, c_m)$ | $Z(c_1, \ldots, c_m) \times \dfrac{2}{K}$ |
|---|---|
| 00000000 | −1−13j |
| 10000000 | −13−15j |
| 01000000 | +13−15j |
| 11000000 | −9−15j |
| 00100000 | −9−13j |
| 10100000 | +11−15j |
| 01100000 | −11−15j |
| 11100000 | +7−15j |
| 00010000 | +9−15j |
| 10010000 | +3−15j |
| 01010000 | −7−15j |
| 11010000 | +15−15j |
| 00110000 | +5−15j |
| 10110000 | −5−15j |
| 01110000 | +1−15j |
| 11110000 | −1−15j |
| 00001000 | −15−15j |
| 10001000 | +9−13j |

TABLE 3-continued

Example of 256 QAM labeling function

| $(c_1,\ldots,c_m)$ | $Z(c_1,\ldots,c_m)\times\frac{2}{K}$ |
|---|---|
| 01001000 | −13−13j |
| 11001000 | +5−13j |
| 00101000 | −5−13j |
| 10101000 | −11−13j |
| 01101000 | −3−15j |
| 11101000 | +13−13j |
| 00011000 | +3−13j |
| 10011000 | −7−13j |
| 01011000 | +7−13j |
| 11011000 | −3−13j |
| 00111000 | +15−13j |
| 10111000 | +1−13j |
| 01111000 | +11−13j |
| 11111000 | −15−13j |
| 00000100 | +9−11j |
| 10000100 | +3−11j |
| 01000100 | +1−11j |
| 11000100 | +13−9j |
| 00100100 | +5−11j |
| 10100100 | −5−11j |
| 01100100 | −7−11j |
| 11100100 | −1−11j |
| 00010100 | −11−11j |
| 10010100 | +15−11j |
| 01010100 | +13−11j |
| 11010100 | −9−11j |
| 00110100 | −1−9j |
| 10110100 | −3−9j |
| 01110100 | −13−9j |
| 11110100 | −7−9j |
| 00001100 | +3−9j |
| 10001100 | −11−9j |
| 01001100 | +7−9j |
| 11001100 | −13−11j |
| 00101100 | +15−9j |
| 10101100 | +1−9j |
| 01101100 | +11−9j |
| 11101100 | −15−9j |
| 00011100 | −5−9j |
| 10011100 | +9−9j |
| 01011100 | −9−9j |
| 11011100 | +5−9j |
| 00111100 | −15−11j |
| 10111100 | +11−11j |
| 01111100 | −3−11j |
| 11111100 | +7−11j |
| 00000010 | −5−5j |
| 10000010 | +1−5j |
| 01000010 | +13−7j |
| 11000010 | −9−7j |
| 00100010 | −1−5j |
| 10100010 | +15−7j |
| 01100010 | +1−7j |
| 11100010 | +7−7j |
| 00010010 | +11−5j |
| 10010010 | −11−5j |
| 01010010 | +7−5j |
| 11010010 | +13−5j |
| 00110010 | +9−7j |
| 10110010 | −13−7j |
| 01110010 | −7−7j |
| 11110010 | +11−7j |
| 00001010 | +15−5j |
| 10001010 | −5−7j |
| 01001010 | −9−5j |
| 11001010 | +5−5j |
| 00101010 | −11−7j |
| 10101010 | −7−5j |
| 01101010 | −13−5j |
| 11101010 | −3−5j |
| 00011010 | −15−7j |
| 10011010 | +3−7j |
| 01011010 | −3−7j |
| 11011010 | −1−7j |
| 00111010 | +3−5j |
| 10111010 | +9−5j |
| 01111010 | +5−7j |
| 11111010 | −15−5j |
| 00000110 | −11−3j |
| 10000110 | +7−3j |
| 01000110 | −15−3j |
| 11000110 | +13−1j |
| 00100110 | +9−3j |
| 10100110 | −1−3j |
| 01100110 | +13−3j |
| 11100110 | +15−3j |
| 00010110 | +5−3j |
| 10010110 | +11−3j |
| 01010110 | +1−3j |
| 11010110 | −5−3j |
| 00110110 | −7−3j |
| 10110110 | −11−1j |
| 01110110 | −9−1j |
| 11110110 | −9−3j |
| 00001110 | −1−1j |
| 10001110 | −3−1j |
| 01001110 | +11−1j |
| 11001110 | −13−3j |
| 00101110 | +3−1j |
| 10101110 | −15−1j |
| 01101110 | +7−1j |
| 11101110 | +5−1j |
| 00011110 | +15−1j |
| 10011110 | −7−1j |
| 01011110 | −5−1j |
| 11011110 | +1−1j |
| 00111110 | −13−1j |
| 10111110 | +3−3j |
| 01111110 | −3−3j |
| 11111110 | +9−1j |
| 00000001 | +9+1j |
| 10000001 | −9+3j |
| 01000001 | +5+1j |
| 11000001 | −9+1j |
| 00100001 | −7+1j |
| 10100001 | +11+1j |
| 01100001 | −7+3j |
| 11100001 | −1+1j |
| 00010001 | +5+3j |
| 10010001 | +15+3j |
| 01010001 | −11+1j |
| 11010001 | +7+3j |
| 00110001 | +1+1j |
| 10110001 | −5+1j |
| 01110001 | +9+3j |
| 11110001 | +15+1 |
| 00001001 | −15+1j |
| 10001001 | +3+1j |
| 01001001 | −15+3j |
| 11001001 | +3+3j |
| 00101001 | +13+3j |
| 10101001 | −1+3j |
| 01101001 | −3+1j |
| 11101001 | +11+3j |
| 00011001 | −11+3j |
| 10011001 | +7+1j |
| 01011001 | +1+3j |
| 11011001 | −13+1j |
| 00111001 | −3+3j |
| 10111001 | −13+3j |
| 01111001 | +13+1j |
| 11111001 | −5+3j |
| 00000101 | −5+5j |
| 10000101 | −15+5j |
| 01000101 | −9+5j |
| 11000101 | +7+7j |
| 00100101 | +3+5j |
| 10100101 | −7+5j |

TABLE 3-continued

Example of 256 QAM labeling function

| $(c_1, \ldots, c_m)$ | $Z(c_1, \ldots, c_m) \times \frac{2}{K}$ |
|---|---|
| 01100101 | +15+5j |
| 11100101 | −11+5j |
| 00010101 | +11+5j |
| 10010101 | +1+5j |
| 01010101 | +7+5j |
| 11010101 | +13+5j |
| 00110101 | −13+5j |
| 10110101 | +9+5j |
| 01110101 | −1+5j |
| 11110101 | +5+5j |
| 00001101 | −15+7j |
| 10001101 | −5+7j |
| 01001101 | −3+7j |
| 11001101 | −3+5j |
| 00101101 | −7+7j |
| 10101101 | −13+7j |
| 01101101 | −11+7j |
| 11101101 | −1+7j |
| 00011101 | +1+7j |
| 10011101 | +11+7j |
| 01011101 | +13+7j |
| 11011101 | −9+7j |
| 00111101 | +9+7j |
| 10111101 | +3+7j |
| 01111101 | +5+7j |
| 11111101 | +15+7j |
| 00000011 | +5+9j |
| 10000011 | +7+9j |
| 01000011 | −15+9j |
| 11000011 | −13+9j |
| 00100011 | +13+9j |
| 10100011 | −1+9j |
| 01100011 | +9+9j |
| 11100011 | +11+9j |
| 00010011 | −11+9j |
| 10010011 | −9+9j |
| 01010011 | +1+9j |
| 11010011 | +3+9j |
| 00110011 | −3+9j |
| 10110011 | +15+9j |
| 01110011 | −7+9j |
| 11110011 | −5+9j |
| 00001011 | +11+11j |
| 10001011 | +1+11j |
| 01001011 | +7+11j |
| 11001011 | +13+11j |
| 00101011 | +3+11j |
| 10101011 | +9+11j |
| 01101011 | +15+11j |
| 11101011 | +5+11j |
| 00011011 | −5+11j |
| 10011011 | −15+11j |
| 01011011 | −9+11j |
| 11011011 | −3+11j |
| 00111011 | −13+11j |
| 10111011 | −7+11j |
| 01111011 | −1+11j |
| 11111011 | −11+11j |
| 00000111 | −15+13j |
| 10000111 | −5+13j |
| 01000111 | −3+13j |
| 11000111 | +7+13j |
| 00100111 | −7+13j |
| 10100111 | −13+13j |
| 01100111 | −11+13j |
| 11100111 | −1+13j |
| 00010111 | +1+13j |
| 10010111 | +11+13j |
| 01010111 | +13+13j |
| 11010111 | −9+13j |
| 00110111 | +9+13j |
| 10110111 | +3+13j |
| 01110111 | +5+13j |
| 11110111 | +15+13j |

TABLE 3-continued

Example of 256 QAM labeling function

| $(c_1, \ldots, c_m)$ | $Z(c_1, \ldots, c_m) \times \frac{2}{K}$ |
|---|---|
| 00001111 | −5+15j |
| 10001111 | −15+15j |
| 01001111 | −9+15j |
| 11001111 | −3+15j |
| 00101111 | −13+15j |
| 10101111 | −7+15j |
| 01101111 | −1+15j |
| 11101111 | −11+15j |
| 00011111 | +11+15j |
| 10011111 | +1+15j |
| 01011111 | +7+15j |
| 11011111 | +13+15j |
| 00111111 | +3+15j |
| 10111111 | +9+15j |
| 01111111 | +15+15j |
| 11111111 | +5+15j |

Figure 7:
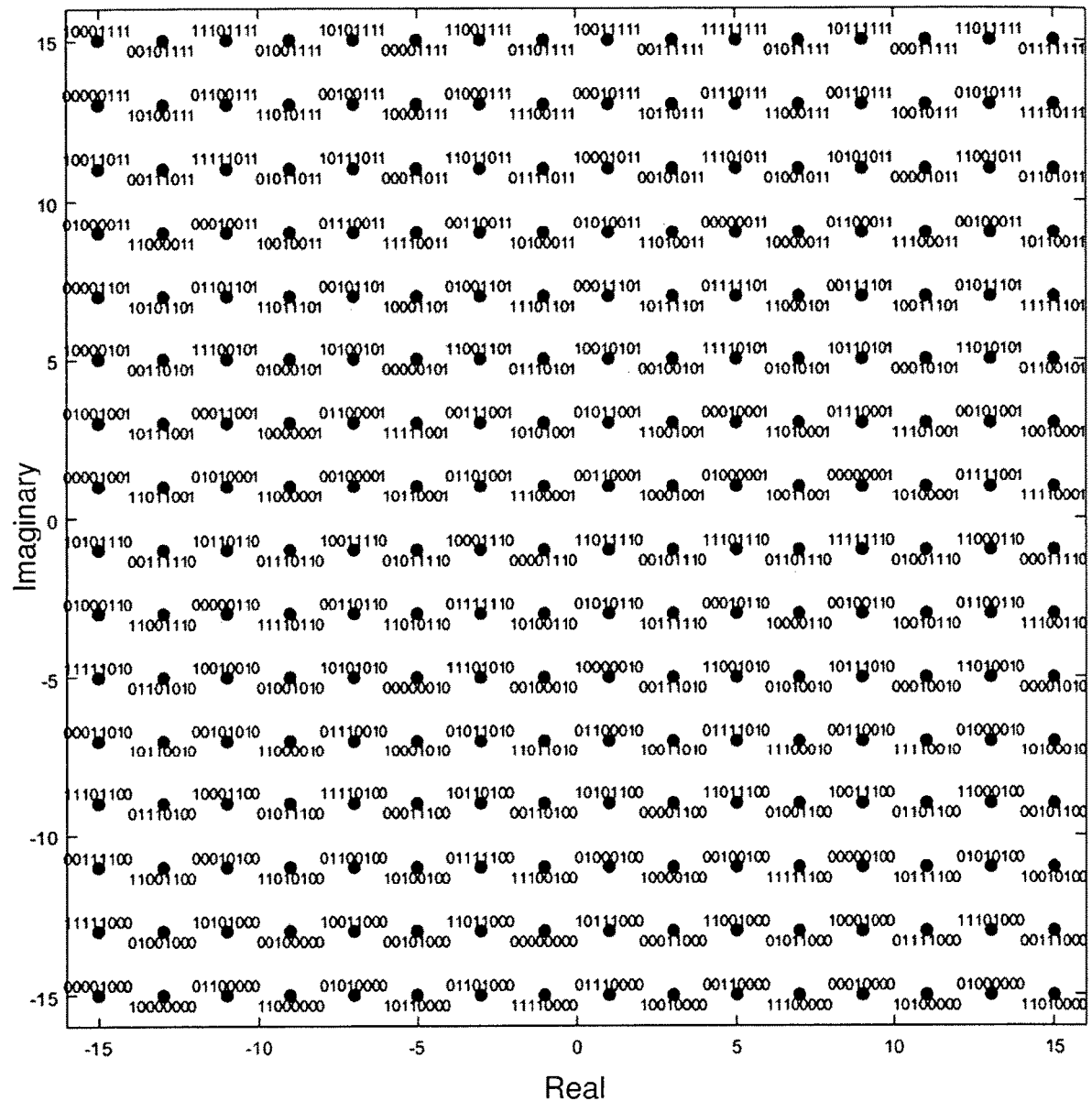
FIG. 7 is a plot representing a preferred embodiment of a 256QAM labeling function.

FIG. 7 represents the labeling function Z given by table 3 in the complex plane. In FIG. 7, K is assumed to be equal to 2. It should be noted that a rotation of the constellation represented in FIG. 7 by a multiple of 90°, or an axial reflection of said constellation with respect to the real axis, or an axial reflection of said constellation with respect to the complex axis, or an inversion of all the bit values, or any combination thereof, does not modify the value of Φ(Z) and therefore yields a labeling function that is equally good.

Figure 8:
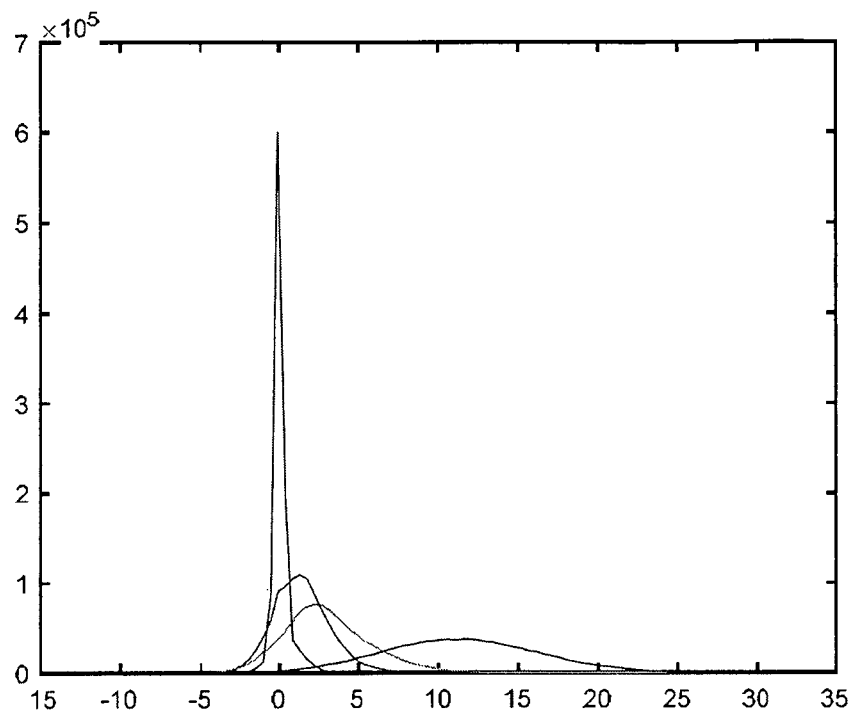
FIG. 8 is a plot representing the log likelihood ratio distribution at the input of the different polar code decoders of a multilevel polar-coded modulation scheme, when using the 16QAM labeling function of FIG. 5.

FIG. 8 represents the input log likelihood ratio distribution for the m polar code decoders when using the 16QAM labeling function given in table 1 above, which to be compared with the input log likelihood ratio distribution for the m polar code decoders when using the Gray labeling function (FIG. 4). As can be seen in FIG. 8, thanks to the particular labeling function identified by the inventors, the input log likelihood ratio distribution is substantially Gaussian for all the m polar code decoders. This makes this specific labeling function suitable for being used with any polar-code expecting input log likelihood ratios following a Gaussian distribution at the decoder, such as those polar-codes designed for binary input AWGN channels.

Another advantage of labeling functions verifying the expression (2) is that they enable performing simple code rate adaptation for all the polar codes used in the multilevel polar-coded modulation.

Indeed, since these labeling functions make each level of the system behave as if it were a binary input AWGN channel, and since the performance for such a binary input AWGN channel can be easily predicted, it is possible to adapt dynamically the respective code rates of the m polar codes to the propagation conditions experienced on each level. This can be done by reusing, on each level, the existing tools for predicting the performance on the binary input AWGN channel. For instance, it is possible to compute a function γ which gives the binary input mutual information as a function of the SNR of an AWGN channel. This formula for computing the function γ is considered to be known to the skilled person for the binary input AWGN channel. Then, it is possible to compute the inverse function of γ, denoted $\gamma^{-1}$ in the sequel. It should be noted that $\gamma^{-1}$ needs to be computed only once, and can then be memorized in storage means of the transmitting device 30. In order to adapt the code rate of the polar code of the i-th level, it is possible to compute the conditional mutual information $I(\overline{b}_i; Y|\overline{b}_1, \ldots, \overline{b}_{i-1})$. Again, the formula for computing the conditional mutual information is considered to be known to the skilled person for the binary input AWGN channel. The SNR experienced on the i-th equivalent level channel, denoted $\hat{\mu}_i$, can then be estimated as $\hat{\mu}_i = \Upsilon^{-1}(I(\overline{b}_i; Y|\overline{b}_1, \ldots, \overline{b}_{i-1}))$. Once $\hat{\mu}_i$ is estimated, the code rate to be used for the polar code of the i-th level can be chosen to be $\Upsilon(\hat{\mu}_i)$. Of course, it also possible to consider a backoff BO, for instance (−1) dB in logarithmic scale, in which case the code rate to be used for the polar code of the i-th level can be chosen to be $\Upsilon(BO \times \hat{\mu}_i)$.

Figure 9:
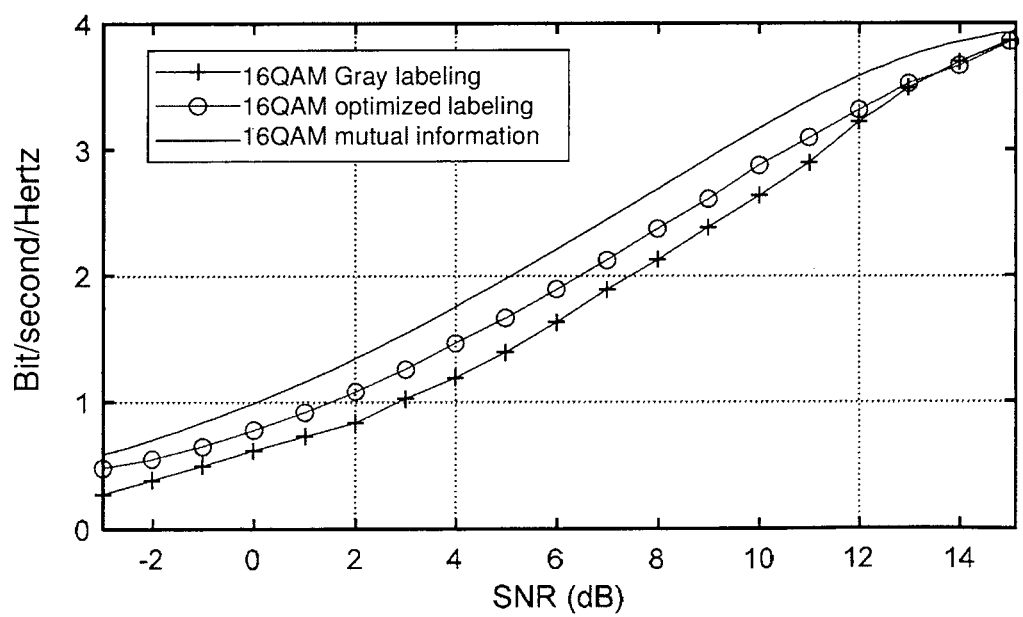
FIG. 9 is a plot comparing the expected throughput performance for the 16QAM Gray labeling function and for the 16QAM labeling function of FIG. 5.

FIG. 9 represents schematically the simulated expected throughput performance for both the 16QAM Gray labeling function and the 16QAM labeling function given in table 1 above, both in the context of a multilevel polar-coded modulation scheme as represented by FIG. 1, and both using polar-codes designed for binary input AWGN channels. Packets of 1024 16QAM symbols are sent. An automatic repeat request (ARQ) scheme is considered for evaluation, which involves that a packet is retransmitted when it is not correctly received. For a given SNR value, the rate splitting for each SNR is the one provided in FIG. 3 and defined according to the above-described procedure. The frozen bits of each of the 4 polar codes are chosen according to its rate. FIG. 9 represents also the mutual information for the 16QAM multilevel polar-coded modulation, i.e. the maximum achievable throughput as defined by information theory. As can be seen in FIG. 9, the optimized 16QAM labeling function introduces a gain of around 1 dB over the conventional 16QAM Gray labeling function.

Figure 10:
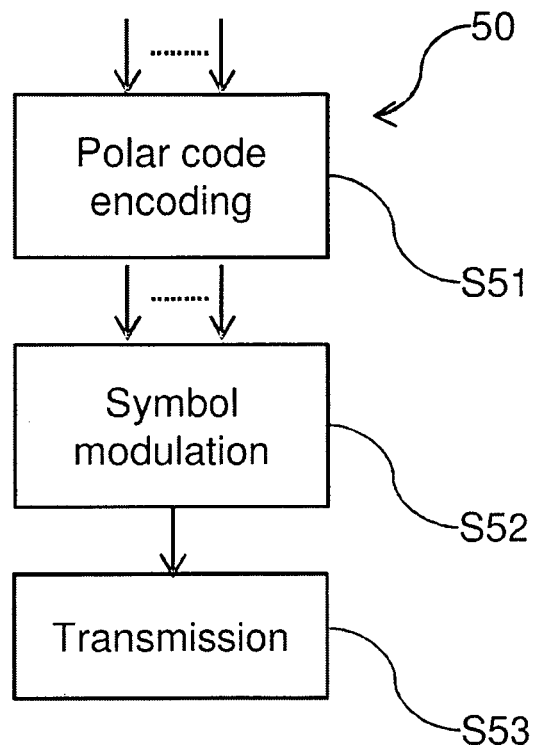
FIG. 10 is a diagram representing the main steps of a transmitting method according to a preferred embodiment.

FIG. 10 represents schematically the main steps of a method 50 for transmitting a data stream from a transmitting device 30 to a receiving device 40. Said data stream corresponds to one or several data packets comprising binary information to be transmitted from the transmitting device 30 to the receiving device 40.

In the present disclosure, the transmitting device 30 can be e.g. a user equipment (UE), a base station, a laptop, a tablet, a mobile phone, or any communicating object that can transmit a data stream to a receiving device 40. Similarly, the receiving device 40 can be e.g. a UE, a base station, a laptop, a tablet, a mobile phone, or any communicating object that can receive a data stream from a transmitting device 30.

The data stream to be transmitted is assumed to comprise m data sub-streams (e.g. data bit vectors $\overline{b}_1, \ldots, \overline{b}_m$). Said data sub-streams can be independent from one another, or can correspond to a same data stream that has been split into m data sub-streams, e.g. by using a serial to parallel converter. As indicated above, in some embodiments, the data stream and/or the data sub-streams can comprise error correcting codes such as CRCs.

As illustrated by FIG. 10, said transmitting method 50 comprises the following steps, executed by the transmitting device 30:

a step S51 of encoding the data sub-streams with respective polar codes, such as to produce m polar-encoded data sub-streams (e.g. polar encoded data bit vectors $\overline{c}_1, \ldots, \overline{c}_m$);

a step S52 of modulating the m polar-encoded data sub-streams onto symbols of a multilevel modulation comprising m levels defining $2^m$ different symbols in the complex plane, according to a predetermined labeling function Z which bijectively associates a symbol to a set $(c_1, \ldots, c_m)$ of m bits from respective polar-encoded data sub-streams, such that successive different sets of m bits from respective polar-encoded data sub-streams are converted into successive symbols forming a symbol stream (e.g. vector $\overline{X}$);

a step S53 of transmitting the symbol stream to the receiving device.

As discussed above, the $2^m$ symbols of the multilevel modulation are distributed in the complex plane such that they are regularly spaced along the real axis and the complex axis by a spacing factor K, and the labeling function Z is such that the expression (2) above is verified. By using such a labeling function, it is possible to use off-the-shelf polar codes designed for binary input AWGN channels. Accordingly, each of the m polar codes used can be, in preferred optional embodiments, a polar code designed for a binary input AWGN channel.

As indicated above, especially when using polar codes designed for a binary input AWGN channel, code rate adaptation is simple. In such a case, the transmitting method 50 can comprise, in preferred optional embodiments:

determining SNRs experienced on each level by each data sub-stream during the propagation from the transmitting device 30 to the receiving device 40, on the equivalent level channel, selecting the code rates of each of the m polar codes used based on the SNRs experienced by each data sub-stream.

For instance, the SNR determination and code rate selection can be performed as discussed above. However, other SNR determination algorithms and/or code rate selection algorithms can also be considered in other embodiments of the present disclosure.

Figure 11:
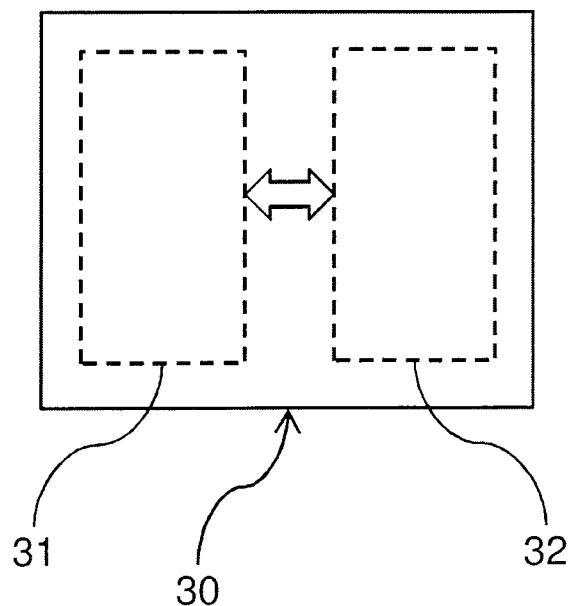
FIG. 11 is a schematic representation of a transmitting device according to a preferred embodiment.

FIG. 11 represents schematically an exemplary embodiment of a transmitting device 30 suitable for implementing the transmitting method 50.

In this exemplary embodiment, the transmitting device 30 comprises a processing circuit 31 comprising one or more processors and storage means (magnetic hard disk, solid-state disk, optical disk, electronic memory, etc.) in which a computer program product is stored, in the form of a set of program-code instructions to be executed in order to implement all or a part of the steps of the transmitting method 50. Alternatively, or in combination thereof, the processing circuit 31 can comprise one or more programmable logic circuits (FPGA, PLD, etc.), and/or one or more specialized integrated circuits (ASIC), and/or a set of discrete electronic components, etc., adapted for implementing all or part of said steps of the transmitting method 50.

The transmitting device 30 comprises also a communication unit 32, coupled to the processing circuit 31, allowing said transmitting device 30 to transmit the symbol stream. The communication unit 32 is preferably a wireless communication unit, in which case it corresponds to a radiofrequency circuit comprising components (antenna(s), amplifier(s), local oscillator(s), mixer(s), analog and/or digital filter(s), etc.) considered known to the skilled person.

In other words, the processing circuit 31 and the communication unit 32 of the transmitting device 30 form a set of means configured by software (specific computer program product) and/or by hardware (processor, FPGA, PLD, ASIC, discrete electronic components, radiofrequency circuit, etc.) to implement all or part of the steps of the transmitting method 50.

Figure 12:
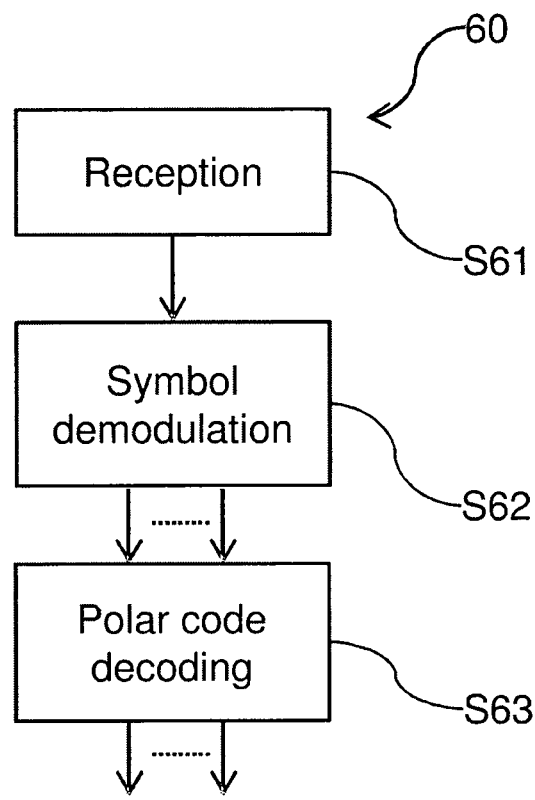
FIG. 12 is a diagram representing the main steps of a receiving method according to a preferred embodiment.

FIG. 12 represents schematically the main steps of a method 60 for receiving a data stream by a receiving device 40, the data stream comprising m data sub-streams transmitted by using the transmitting method 60.

As illustrated by FIG. 12, said receiving method 60 comprises the following steps, executed by the receiving device 40:

a step S61 of receiving the symbol stream (e.g. vector $\overline{Y}$) including the data stream, a step S62 of demodulating the symbols of the symbol stream in order to produce m polar-encoded data sub-streams, by applying an inverse function of the labeling function Z, a step S63 of decoding successively the m polar-encoded data sub-streams such as to produce m data sub-streams, by applying respective polar-code decoders.

It should be noted that the demodulating S62 and decoding S63 steps can be performed simultaneously, by performing joint demodulation/decoding.

Of course, the polar code decoders used are adapted to the polar code encoders used by the transmitting device 30. Hence, in preferred embodiments, each of the m polar code decoders used is designed for decoding a polar code designed for a binary input AWGN channel. In preferred embodiments, each polar-code decoder used in the decoding step S63 is a list decoder. The list decoder is considered to be known to the skilled person.

Figure 13:
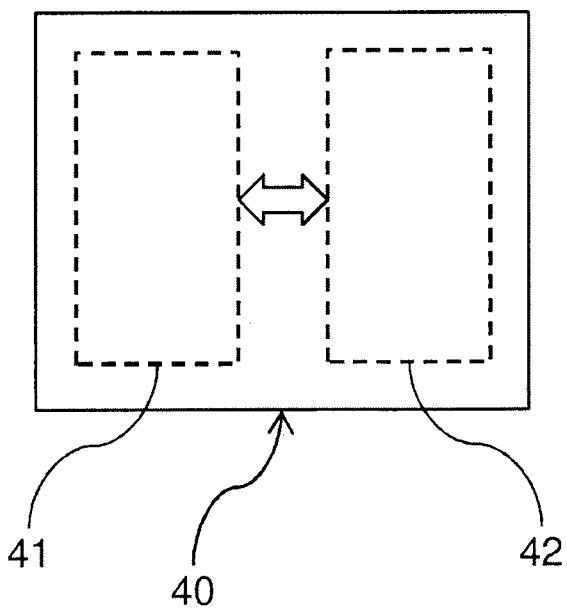
FIG. 13 is a schematic representation of a receiving device according to a preferred embodiment.

FIG. 13 represents schematically an exemplary embodiment of a receiving device 40 suitable for implementing the receiving method 60.

In this exemplary embodiment, the receiving device 40 comprises a processing circuit 41 comprising one or more processors and storage means (magnetic hard disk, solid-state disk, optical disk, electronic memory, etc.) in which a computer program product is stored, in the form of a set of program-code instructions to be executed in order to implement all or a part of the steps of the receiving method 60. Alternatively, or in combination thereof, the processing circuit 41 can comprise one or more programmable logic circuits (FPGA, PLD, etc.), and/or one or more specialized integrated circuits (ASIC), and/or a set of discrete electronic components, etc., adapted for implementing all or part of said steps of the receiving method 60.

The receiving device 40 comprises also a communication unit 42, coupled to the processing circuit 41, allowing said receiving device 40 to receive the symbol stream. The communication unit 42 is preferably a wireless communication unit, in which case it corresponds to a radiofrequency circuit comprising components (antenna(s), amplifier(s), local oscillator(s), mixer(s), analog and/or digital filter(s), etc.) considered known to the skilled person.

In other words, the processing circuit 41 and the communication unit 42 of the receiving device 40 form a set of means configured by software (specific computer program product) and/or by hardware (processor, FPGA, PLD, ASIC, discrete electronic components, radiofrequency circuit, etc.) to implement all or part of the steps of the receiving method 60.

The above description clearly illustrates that by its various features and their respective advantages, the present disclosure reaches the goals set for it. In particular, by optimizing the labeling function such as to produce log likelihood ratios which follow a Gaussian distribution for all the levels of the multilevel polar-coded modulation, it is possible to have a simple and efficient multilevel polar-coded modulation scheme that can use off-the-shelf polar codes designed for a binary input AWGN channel. Also, such a multilevel polar-coded modulation scheme can provide predictable performance on each of the levels, which is suitable for allowing simple code rate adaptation, if necessary.

The invention claimed is:

1. A method for transmitting a data stream from a transmitting device to a receiving device, the data stream comprising m data sub-streams, m ≥4, said method comprising:

encoding the data sub-streams with respective polar codes, such as to produce m polar-encoded data sub-streams, modulating the m polar-encoded data sub-streams onto symbols of a multilevel modulation comprising m levels defining $2^m$ different symbols in a complex plane, according to a predetermined labeling function Z which bijectively associates a symbol to a set $c_1, \ldots, c_m$ of m bits from respective polar-encoded data sub-streams, such that successive sets of m bits from respective polar-encoded data sub-streams are converted into successive symbols forming a symbol stream, transmitting the symbol stream to the receiving device, wherein the $2^m$ symbols of the multilevel modulation are distributed in the complex plane such that they are regularly spaced along the real axis and the complex axis by a spacing factor K, wherein the predetermined labeling function Z is such that:

$$\Phi(Z) < 1.7^m \times (0.0425 \times m - 0.06)$$

expression in which:

$$\Phi(Z) = \sum_{i=1}^{m} \sum_{\{c_1, \ldots, c_m\}} \sum_{\{c'_i, \ldots, c'_m\} \setminus \{c_i, \ldots, c_m\}} e^{-\frac{4}{K^2}|Z(c_1, \ldots, c_m) - Z(c_1, \ldots, c_{i-1}, c'_i, \ldots, c'_m)|^2}.$$

2. The method according to claim 1, wherein each of the m polar codes used is a polar code designed for a binary input additive white Gaussian noise, AWGN, channel.

3. The method according to claim 1, wherein the respective code rates of the m polar codes are adapted to propagation conditions.

4. The method according to claim 3, comprising:

determining signal to noise ratios, SNRs, experienced by each data sub-stream during the propagation from the transmitting device to the receiving device, selecting the code rates of each of the m polar codes used based on the SNRs experienced by each data sub-stream.

5. The method according to claim 1, wherein the data sub-stream and/or each of the data sub-streams include an error detection code.

6. The method according to claim 1, wherein the multilevel modulation is a 16QAM modulation, and the labeling function is given by the following table, or by the following table modified by rotating the constellation of symbols in the complex plane by an angle multiple of 90°, and/or by applying an axial reflection to the constellation of symbols with respect to the real axis, and/or by applying an axial reflection to the constellation of symbols with respect to the complex axis, and/or by inverting all the bit values:

| $(c_1, \ldots, c_m)$ | $z(c_1, \ldots, c_m) \times \frac{2}{K}$ |
| --- | --- |
| 0000 | +3−1j |
| 1000 | +3−3j |
| 0100 | −3−3j |
| 1100 | −3−1j |
| 0010 | −1−1j |
| 1010 | −1−3j |
| 0110 | +1−3j |
| 1110 | +1−1j |

-continued

| $(c_1, \ldots, c_m)$ | $z(c_1, \ldots, c_m) \times \frac{2}{K}$ |
|---|---|
| 0001 | −3+1j |
| 1001 | −1+1j |
| 0101 | +1+1j |
| 1101 | +3+1j |
| 0011 | +3+3j |
| 1011 | +1+3j |
| 0111 | −1+3j |
| 1111 | −3+3j. |

7. A non-transitory computer-readable storage medium comprising instructions which, when executed by a processor, configure said processor to carry out a transmitting method according to claim 1.

8. A device for transmitting a data stream to a receiving device, comprising a processing circuit configured to carry out a transmitting method according to claim 1.

9. A method for receiving a data stream by a receiving device, said data stream comprising m data sub-streams, m ≥4, comprising:
receiving a symbol stream including the data stream from a transmitting device, the symbol stream including symbols of a multilevel modulation comprising m levels defining $2^m$ different symbols in a complex plane,
demodulating the symbols of the symbol stream in order to produce m polar-encoded data sub-streams, by applying an inverse function of a predetermined labeling function Z which bijectively associates a symbol to a set $c_1, \ldots, c_m$ of m bits from respective polar-encoded data sub-streams,
decoding successively the m polar-encoded data sub-streams such as to produce m data sub-streams, by applying respective polar-code decoders,
wherein the $2^m$ symbols of the multilevel modulation used are distributed in the complex plane such that they are regularly spaced along the real axis and the complex axis by a spacing factor K,
wherein the predetermined labeling function Z is such that:

$$\Phi(Z) < 1.7^m \times (0.0425 \times m - 0.06)$$

expression in which:

$$\Phi(Z) = \sum_{i=1}^{m} \sum_{\{c_1, \ldots, c_m\}} \sum_{\{c'_i, \ldots, c'_m\} \setminus (c_i, \ldots, c_m)} e^{-\frac{4}{K^2}|Z(c_1, \ldots, c_m) - Z(c_1, \ldots, c_{i-1}, c'_i, \ldots, c'_m)|^2}.$$

10. The method according to claim 9, wherein each of the m polar code decoders used is designed for decoding a polar code designed for a binary input additive white Gaussian noise, AWGN, channel.

11. The method according to claim 9, wherein each polar-code decoder used is a list decoder.

12. A non-transitory computer-readable storage medium comprising instructions which, when executed by a processor, configure said processor to carry out a receiving method according to claim 9.

13. A device for receiving a data stream from a transmitting device, comprising a processing circuit configured to carry out a receiving method according to claim 9.

\* \* \* \* \*